United States Patent [19]

Weinzierl et al.

[11] 4,371,508

[45] Feb. 1, 1983

[54] METHOD FOR OPERATING A FLUE GAS DESULFURIZATION

[75] Inventors: Klaus Weinzierl; Robert Karger, both of Dortmund, Fed. Rep. of Germany

[73] Assignee: L. & C. Steinmüller GmbH, Gummersbach, Fed. Rep. of Germany

[21] Appl. No.: 200,973

[22] Filed: Oct. 27, 1980

[30] Foreign Application Priority Data

Oct. 27, 1979 [DE] Fed. Rep. of Germany ....... 2943468

[51] Int. Cl.³ .............................................. C04B 17/00
[52] U.S. Cl. .................................... 423/242; 210/749
[58] Field of Search .......... 423/242 A, 242 R, 244 A, 423/244 R; 210/749

[56] References Cited

U.S. PATENT DOCUMENTS

| 3,903,243 | 9/1975 | Atsukawa et al. | 423/242 A |
| 4,166,838 | 9/1979 | Tatani et al. | 423/242 A |
| 4,174,375 | 11/1979 | Holehouse | 423/242 A |

FOREIGN PATENT DOCUMENTS 49-61085  6/1974  Japan ................................... 423/242

*Primary Examiner*—O. R. Vertiz
*Assistant Examiner*—Gregory A. Heller
*Attorney, Agent, or Firm*—Becker & Becker, Inc.

[57] ABSTRACT

A method of operating a flue gas desulfurization with a steam power plant heated with fossil fuels. The sulfur dioxide contained in the flue gas is removed in a wash tower by means of an excess of milk of lime or limestone, and the resulting sulfite is oxidized with air at a low pH-value into calcium sulfate. The non-converted milk of lime or limestone is neutralized at least partially by an addition of acid waste waters from a complete desalination plant for the supply water, and/or by an addition of acid condensate from the flue or chimney of the steam power plant. An installation for carrying out the method of the present invention includes a wash tower having flue gas flowing therethrough, an oxidation tower having air flowing therethrough, milk of lime or limestone supply into the wash tower, and a delivery device for the wash liquid in the wash tower and in the oxidation tower, with the device having a pump for liquid drawn off from the sump of the wash tower. The sump of the wash tower is connected with a supply line for acid waste water from a complete desalination plant, and/or with a supply line for acid condensate from the chimney or flue of the steam power plant.

3 Claims, 1 Drawing Figure

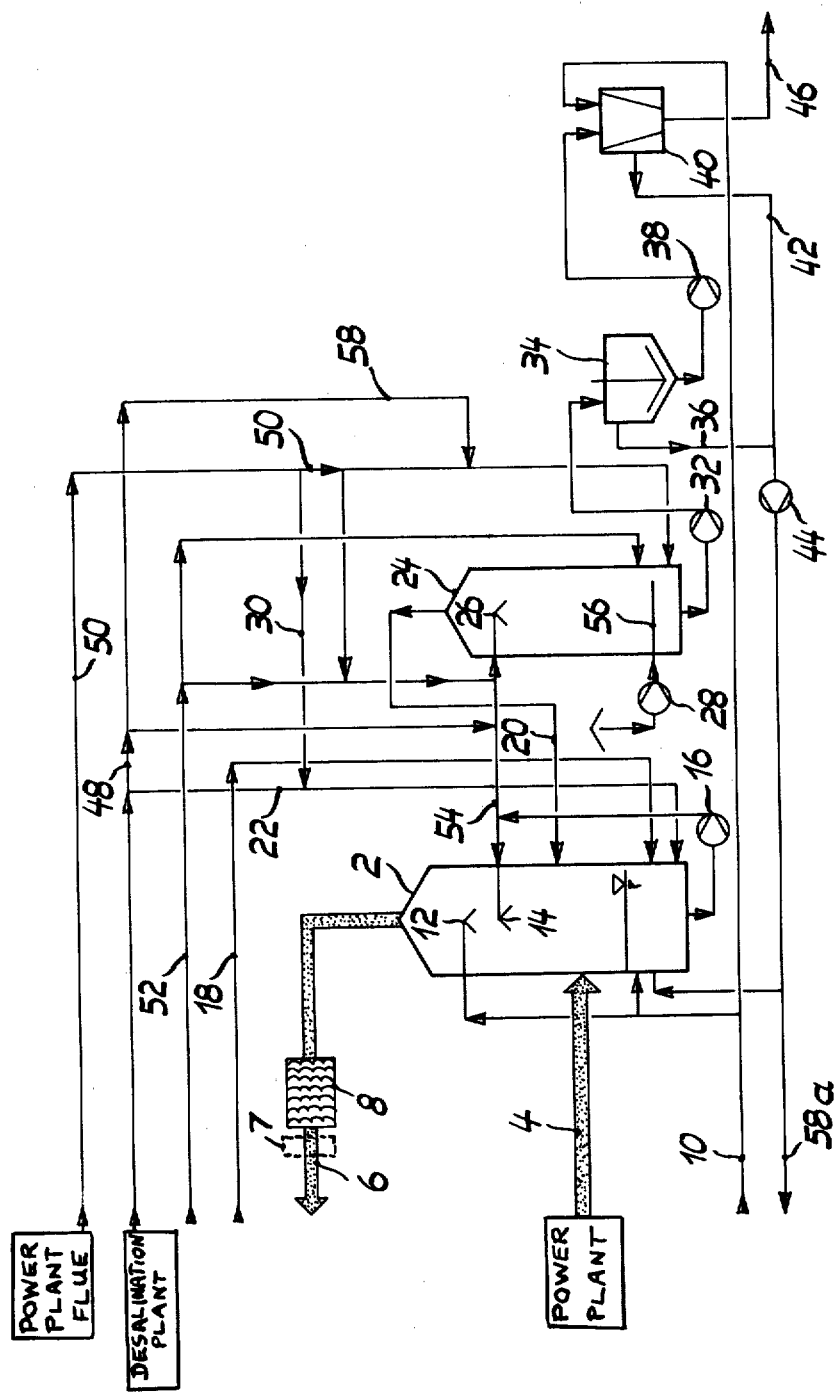

METHOD FOR OPERATING A FLUE GAS DESULFURIZATION

The present invention relates to a method of operating a flue gas desulfurization in connection with a steam power plant fired with fossil fuels. According to this method, the sulfur dioxide contained in the flue gas is separated or removed in a wash tower or scrubber by means of an excess of milk of lime or limestone, and the resulting calcium sulfite is oxidized with air at a low pH-value to calcium sulfate. The present invention furthermore concerns a flue gas desulfurization installation with a wash tower having flue gas flowing therethrough, with an oxidation tower having air flowing therethrough, with milk of lime or limestone addition into the wash tower, and with a delivery device for the wash liquid in the wash tower and in the oxidation tower, with the device having a pump for liquid drawn off from the wash tower sump.

The wash solution removed from circulation from the wash tower passes into the oxidation tower with a certain excess of milk of lime $(Ca(OH)_2)$ and/or limestone $(CaCO_3)$. The excess milk of lime is neutralized in the oxidation tower, the limestone is converted, the calcium sulfite $(CaSO_3 \cdot \frac{1}{2}H_2O)$ formed in the wash tower is partially converted into calcium hydrogen sulfite $(Ca(HSO_3)_2)$, and thereby the pH-value of the liquid located in the oxidation tower is adjusted to the optimum pH-value for the oxidation. With certain of the known flue gas desulfurization installations, these oxidation conditions or requirements must be set or adjusted by adding sulfuric acid by means of the delivery device, or into the sump of the oxidation tower.

On the other hand, the leakage rates of the circulation in the thermic cycle of a steam power plant must be continuously covered or compensated for by adding completely desalinated water. In this connection, waste waters are continuously produced, and are drawn off after neutralization with a solution of caustic soda in a main drainage channel or surface waters. The acid condensates produced in the flue or chimney of the power plant must also be neutralized by a solution of caustic soda before they can be drawn off.

The present invention proceeds on the basis of the reasoning that with conventional operation of a steam power plant, on the one hand, excess milk of lime is continuously neutralized with acid, or limestone must be converted, and, on the other hand, both in the complete desalination plant and also in the chimney or flue acid components are produced. Accordingly, an object of the present is to combine the three aforementioned partial processes of the power plant operation, namely the flue gas desulfurization, the complete desalination, and the treatment of the condensate in the chimney or flue the foregoing occurs in such a manner that the least possible amount of waste water is conducted away, and furthermore this waste water is as pure as possible.

This object, and other objects and advantages of the present invention, will appear more clearly from the following specification in connection with the accompanying drawing, which is a schematic illustration of one embodiment of the inventive installation.

The method of the present invention is characterized primarily in that the non-converted milk of lime or limestone in the flue gas desulfurizing installation is neutralized at least partially by an addition of acid waste water from a complete desalination plant for the supply or feed water, and/or by an addition of acid condensate from the chimney or flue of the steam power plant.

In this manner, the sulfuric acid consumption for neutralization of the milk of lime is considerably reduced, and the solution of caustic soda for neutralization of the acid/waste water from the complete desalination plant, or the acid condensate from the chimney or flue of the steam power plant, is saved. Since the acid waste waters from the complete desalination plant contain essentially chlorides, a concentration increase of the chlorides inventively results during introduction of these acid waste waters into the flue gas desulfurization installation, so that the waste water quantity is reduced and an economical concentration or vaporization is made possible. The requirement or need for caustic soda solution for neutralization of this condensate is reduced in the same manner by the return of the acid condensate from the chimney or flue of the steam power plant, so that here too a considerable savings results.

Advantageously, for the purpose of adjusting the pH-value during oxidation of the calcium sulfite to calcium sulfate, the acid waste waters from the complete desalination plant, and/or the acid condensate from the chimney or flue of the steam power plant, can be used. In this manner, the resulting acid waste waters are completely used. Caustic soda solution for regenerating the anion exchanger of the complete desalination plant is now needed only in stoichiometric quantity.

The flue gases may be adiabatically cooled by $H_2O$ vaporization, and the supplied waste water from the complete desalination plant, and the condensate from the chimney or flue, may be concentrated.

The present inventive method or procedure is characterized in that the wash tower, or its sump, is connected with a supply line for acid waste water from a complete desalination plant, and/or with a supply line for acid condensate from the chimney or flue of the steam power plant. Advantageously, the oxidation tower, for supply of sulfuric acid, can additionally be connected with a supply line for acid waste water from a complete desalination plant, and/or with a supply line for acid condensate from the chimney or flue of the steam power plant. The acid waste waters are supplied to the wash tower and/or to the oxidation tower by a suitable delivery device.

The waste water from the complete desalination plant, and/or the acid condensate, are selectively supplied to the washing medium supply line, or delivery device, or into the sump of the oxidation tower for adjusting the pH-value in the oxidation tower.

Referring now to the drawing in detail, the flue gas coming from a non-illustrated steam power plant is supplied to a washing or scrubbing tower 2 in the middle region by way of a flue gas supply conduit 4. After the washing, after the flue gas flows through a droplet separator 8, and, if necessary, through a flue gas heater 7, the flue gas escapes by way of a flue gas discharge or outlet 6. This flue gas heater is heated either externally or is embodied as a heat exchanger which on the one hand has passing therethrough flue gas supplied from the wash tower 2, and on the other hand has passing therethrough the flue gas taken from the wash tower 2. The wash tower 2 is connected with a process water conduit 10. This process water is selectively added or supplied into the upper region of the wash tower 2 by way of a delivery device 12, or is delivered into the sump of the wash tower and added for rinsing the centrifuge 40.

A liquid delivery or discharge 14 is located below the delivery device 12 for the washing liquid circulated with a pump 16. The pump 16 suctions or draws off from the sump of the wash tower. A milk of lime or limestone supply 18 is also arranged in this region. Below the liquid delivery 14, the exhaust air from the oxidation tower 24 is introduced by way of a conduit or line 20. From the washing medium circulation, after the pump 16, a partial flow is removed by way of a conduit 54 to the oxidation tower 24, where it is added with a delivery device 26. The wash tower 2 is connected by a conduit 22 with a waste water conduit 48 from a complete desalination plant, and with a condensate branch conduit 30 of acid condensate from the flue or chimney of the steam power plant.

The oxidation tower 24 is also connected with the waste water conduit 48 from the complete desalination plant, and with a condensate conduit 50 of acid condensate from the chimney or flue of the steam power plant. The waste water from the complete desalination plant, and the condensate from the power plant chimney or flue, can be added selectively by the conduit 54 to the fluid deliveries 14, 16, or by conduits 22, 58 into the sump of the wash tower 2 and/or of the oxidation tower 24.

The oxidation air is supplied to the oxidation tower 24 with a blower or compressor 28 by way of a distribution device 56. The oxidized washing liquid is conveyed from the oxidation tower 24 with the pump 32 into a thickener or concentrator 34. From the thickener 34, the pump 38 conveys the turbid liquid (calcium sulfate + washing liquid) to a centrifuge 40. The clear flow of the thickener 34 is drawn off by a pump 44 together with the filtrate coming from the centrifuge 40 by way of a conduit 42. A portion of this flow is returned to the wash tower 2. The remainder is discharged by a conduit 58a as waste water.

The materials found in suspension, essentially gypsum ($CaSO_4.2H_2O$), are delivered with the centrifuge 40 by way of a gypsum withdrawal 46.

The sulfur dioxide contained in the flue gas is precipitated in the wash tower 2 by the lime water as calcium sulfite. For this purpose on the one hand there is needed an excess of milk of lime or limestone which, however, on the other hand must be neutralized again. Acid condensate from the chimney or flue of the steam power plant and/or waste water from the complete desalination point are admixed for this purpose. Hydrochloric acid, sulfuric acid, and nitric acid are present as the acid components of the waste water from the complete desalination plant. These acids react with the milk of lime and the carbonates and form calcium chloride, calcium sulfate (gypsum), and calcium nitrate.

Consequently, neither additional sulfuric acid needs to be provided for neutralizing the excess milk of lime from the wash tower 2, nor is there any need for neutralizing the acid components of the waste water from the complete desalination plant and/or from the condensate of the power plant chimney or flue by means of caustic soda solution.

A portion of the liquid drawn off by the pump 16 in the sump of the wash tower 2 is added by means of the delivery device 26 in the oxidation tower 24, where the calcium sulfite is oxidized to calcium sulfate, i.e. gypsum, by means of the air blown in by the blower 28. So that the oxidation occurs as completely as possible, it is necessary to adjust the pH-value of the liquids in the oxidation tower by acids so as to have a lower or more acidic value. This occurs with acids coming from the chimney or flue of the steam power plant, essentially condensates containing sulfurous acid and sulfuric acid, and/or occurs with the waste water from the complete desalination plant.

Process water must be continuously supplied to the process during the adiabatic cooling of the flue gases in the wash tower 2 by $H_2O$ vaporization. During the introduction of waste water from the complete desalination plant, and/or acid condensate from the chimney or flue of the steam power plant, the process water quantity can be reduced in conformity with the $H_2O$ supplied from the waste water of the complete desalination plant and from the acid condensate. The salt concentration in the waste water from the complete desalination plant, and in the acid condensate from the power plant chimney or flue, thereby determines the salt concentration of the wash circulation of the flue gas desulfurization installation. With the sought salt concentrations in relation to the chloride in the wash circulation of the flue gas desulfurization installation, the waste water from the flue gas desulfurization installation can be supplied to a thermal waste water treatment (evaporator or vaporizer, spray-dryer, whirl or fluidized bed) at an economically feasible cost.

The waste water from the complete desalination plant, and the acid condensate from the flue or chimney of the steam power plant, can as illustrated, be supplied separately to the inventive installation, or they can be added in common either into the wash tower 2 or into the oxidation tower 24. The type and manner of dosing of the waste water from the complete desalination plant, and of the acid condensate from the flue or chimney of the steam power plant, depends upon the composition of these liquids and upon the type and manner of the operation of the flue gas desulfurization.

The present invention is, of course, in no way restricted to the specific disclosure of the specification and drawing, but also encompasses any modifications within the scope of the appended claims.

What we claim is:

1. A method of operating with the suspension existing after a flue gas desulfurization in connection with a steam power plant fired with fossil fuels, said method including the steps of:
    removing the sulfur dioxide contained in said flue gas by means of an excess of one of the group consisting of milk of lime and limestone to produce calcium sulfite and to leave non-converted excess in the suspension;
    oxidizing said produced calcium sulfite with air at a low pH-value to calcium sulfate; and;
    at least partially neutralizing said non-converted excess by addition of at least one of the group consisting of the acid waste water from a complete desalination plant for feed water, and the acid condensate from the flue of said steam power plant.

2. A method according to claim 1, which includes the step of adjusting the pH-value, during said step of oxidizing said calcium sulfite to calcium sulfate, by utilizing at least one of the group consisting of the acid waste from a complete desalination plant, and the acid condensate from the flue of said steam power plant.

3. A method according to claim 2, which includes the steps of adiabatically cooling said flue gas by $H_2O$ vaporization, and concentrating said supplied waste water and said condensate.

* * * * *